UNITED STATES PATENT OFFICE.

JAMES A. McLARTY, OF TORONTO, ONTARIO, CANADA.

METHOD OF TREATING METALS.

1,073,076.  Specification of Letters Patent.  Patented Sept. 9, 1913.

No Drawing.  Application filed March 21, 1913. Serial No. 756,032.

*To all whom it may concern:*

Be it known that I, JAMES A. MCLARTY, a subject of the King of Great Britain, residing at Toronto, in the county of York, Province of Ontario, Canada, have invented certain new and useful Improvements in Methods of Treating Metals, of which the following is a specification.

This invention relates to treating metals;
and it comprises a process of treating metals for the purpose of rendering them proof against oxidation, rusting, etc., and of converting them into a stable form wherein such metals are exposed to the vapors generated from a heated material comprising a carbohydrate, such as sawdust, paper, etc., a material comprising an oily carbon compound, such as crude petroleum oil, and water; all as more fully hereinafter set forth and as claimed.

I have discovered that by exposing metals to vapors generated at a comparatively low temperature from materials comprising a carbohydrate, materials comprising oily carbon compounds and water, I can produce a change in such metals which renders them of better properties for many purposes, making them proof or stable against ordinary atmospheric conditions and enhancing generally their valuable properties.

My process may be carried out in any suitable form of apparatus in which the metals can be exposed to the stated vapors for a sufficient length of time. The length of time will generally depend upon the size, shape and material treated; but for small articles I find that 4 or 5 hours' exposure are sufficient. The length of time will also depend on how fargoing a change in the article is desired. The temperature may vary within wide limits, but generally speaking the lower the temperature of the vapors the longer must be the period of exposure. The temperature of the material itself is never allowed to go to a red heat and is always below this point. In some cases after exposure to the stated vapors at a low temperature, I may allow or cause ignition of the vapors to take place and continue the treatment in a flaming or burning condition of such vapors, the flaming or burning of such vapors being allowed to continue as long as may seem desirable.

Prior to exposure of the materials to the stated vapors it is often useful to remove the air in the treating apparatus by a vacuum pump, by blowing through steam, etc.

The described process may be used for treating any of the common metals. I have found it particularly useful in treating iron, steel, copper, bronze, brass, journal metals, etc. Bronze journals treated in this manner run cool for very much longer time than untreated journals of the same lot of metal.

The described invention may be carried out in many different types of apparatus and in many specific embodiments. In one form which I have found useful, the vapor yielding substances may be placed at the bottom of a suitable container, which may be of any dimensions, shape or material, the metal to be treated suspended therein, the container then closed and the whole assemblage exposed to heat, as by flame heating the base of the container. For example, in treating small sized journal bearings I may take a container, closable in any suitable way, of any suitable size, and suspend the bearing near its top, say 8 or 10 inches above the bottom. In the bottom I may place half a pound to a pound of shavings, sawdust, excelsior, etc., first treated with some water; say 50 to 60 per cent. To this mixture I add an oily material, say crude petroleum oil. About 2 ounces, with the s..ted amounts of sawdust and water, will suffice. Closing the container I then apply heat to the bottom until vapors are formed and displace the air, if this has not previously been evacuated. If the container is hermetically sealed, the air will remain, but it does no particular harm. In these vapors I allow the journal to remain for the length of time which may be deemed desirable, this being controlled by an examination from time to time. Ordinarily, I start with a heat of the vapors around 212° Fahrenheit, and may subsequently raise it to, say, 300° F.

On removing the journal from the vapors it will be found less susceptible of oxidation, of less frictional resistance and generally to have its characteristic valuable properties enhanced.

The same results in an enhanced degree may be secured by a further modification of my invention in which, after treating the material in a closed container with the vapors in the manner described I finally set fire to the vapors and allow the metal to contact with the burning or ignited vapors, the contact with such vapors in a flaming state being continued as long as may be desirable.

In the case of iron and steel, either treatment results in a softening of the metal. This may be obviated by re-heating in the usual way and re-hardening. Such reheating in a blacksmith's forge or the like I find does not destroy the valuable properties given the metal by the described treatment.

It is not necessary that the vapors be generated in the same container as that holding the metal article to be treated. They may be generated in a separate container and the vapors passed through any suitable conduit into contact with such metal.

In lieu of woody material such as stated, I may use any other vegetable material containing or composed of a carbohydrate as, for example, molasses, cane sugar. A paste of cane sugar and oil with some water gives good results. In lieu of the crude petroleum oil I may use various petroleum preparations or derivatives, such as kerosene, gasolene, spindle oils, lubricating oils, "still bottoms," petroleum residua, etc. Paraffin ordinarily requires an inconvenient heightening of temperature. Animal and vegetable fats and oils may be used, but petroleum oils appear to be more advantageous.

The heating may be accomplished in any suitable manner. Flame heat is frequently convenient, but electric heat, jacket heat, using suitable heating fluids, etc., may be employed.

As to the chemistry of the reactions involved, I cannot definitely say, and content myself with noting the operations performed and the results attained.

Methods of treatment with like materials in a manner analogous to that here described may be used with other materials. I have for instance found that similar methods may be used in treating wood, lace, leather, etc.

In the case of iron treated by the present process the material becomes incapable of corrosion or rust or other alterations under atmospheric conditions. Such treated iron may be heated to a white heat or hot-worked into any shape without altering its newly acquired properties. It may be welded with facility. In a modification of my invention I can produce like results by generating the vapors from materials directly in contact with the article under treatment; as by coating a metal article with a paste of, say, molasses and oil (molasses furnishing both the carbohydrate and water) and then heating in any suitable way.

The pressure prevailing in the vapor treatment may be as desired; and may be above, below or at atmospheric pressure.

The modification of this process, in which water is not employed with the carbohydrate and hydrocarbon, is described and claimed in my copending applications, 648,759, filed Sept. 11, 1911 and 732,567, filed Nov. 20, 1912.

What I claim is:—

1. The process of treating metals which comprises exposing metal articles to vapors produced from materials comprising water, an oily carbon compound and a carbohydrate material, the temperature of such articles being maintained at a point below a red heat.

2. The process of treating metals which comprises placing metal articles in a container and exposing them therein to vapors generated by heat from material comprising water, an oily carbon compound and a carbohydrate material, the temperature of such articles being maintained at a point below a red heat.

3. The process of treating metals which comprises exposing metal articles to vapors produced from material comprising water, an oily carbon compound and a carbohydrate material, and after a period of exposure to such vapors igniting the vapors while still in contact with said metal articles.

4. The process of treating metals which comprises placing metal articles in a container and exposing them therein to vapors generated by heat from material comprising water, an oily carbon compound and a carbohydrate material, and after a period of exposure to such vapors igniting the vapors while still in contact with said metal articles.

5. A process of treating or preserving metals which comprises exposing a metal in a suitable container capable of being closed to vapors produced from a carbohydrate and an oily carbon compound, igniting such vapors and allowing contact of such metal for a suitable time with the gaseous products of such ignited vapors.

In testimony whereof I affix my signature in presence of two witnesses.

JAMES A. McLARTY.

Witnesses:
U. S. J. DUNBAR,
W. A. CORNISH.